United States Patent [19]

Souda

[11] Patent Number: 4,750,602

[45] Date of Patent: Jun. 14, 1988

[54] GUIDE CHUTE FOR DROPPING ARTICLES

[75] Inventor: Takeshi Souda, Tokyo, Japan

[73] Assignee: Toyota Jidosha Kabushiki Kaisha, Aichi, Japan

[21] Appl. No.: 16,380

[22] Filed: Feb. 19, 1987

[30] Foreign Application Priority Data

Apr. 11, 1986 [JP] Japan .................. 61-055089[U]

[51] Int. Cl.$^4$ ............................................. B65G 11/10
[52] U.S. Cl. ...................... 193/25 E; 193/7; 193/25 S; 193/25 C; 193/32
[58] Field of Search ............... 193/25 E, 25 R, 25 C, 193/7, 25 S, 32, 33, 34, 2 A; 221/193, 312 R; 222/564, 547

[56] References Cited

U.S. PATENT DOCUMENTS

| | | |
|---|---|---|
| 195,489 | 9/1877 | Crompton et al. |
| 1,101,561 | 6/1914 | McPhayden ............... 193/25 E X |
| 2,650,464 | 9/1953 | Bernheim .................. 193/7 X |
| 2,693,264 | 11/1954 | Waterbury . |
| 2,973,112 | 2/1961 | Young ....................... 193/7 X |
| 3,428,156 | 2/1969 | Charyn et al. ............ 193/25 R X |
| 3,664,104 | 5/1972 | Jamshidi . |
| 3,854,273 | 12/1974 | Rosenberg . |
| 3,934,691 | 1/1976 | Toloczko ................... 193/32 |
| 3,949,850 | 4/1976 | Schumm .................... 193/25 E |

FOREIGN PATENT DOCUMENTS

| | | |
|---|---|---|
| 0073349 | 3/1983 | European Pat. Off. ......... 193/2 A |
| 1533819 | 9/1973 | Fed. Rep. of Germany . |
| 2326695 | 12/1973 | Fed. Rep. of Germany . |
| 382376 | 10/1932 | United Kingdom ........... 193/32 X |
| 1594080 | 7/1981 | United Kingdom . |

Primary Examiner—Galen Barefoot
Assistant Examiner—James M. Kannofsky
Attorney, Agent, or Firm—Parkhurst & Oliff

[57] ABSTRACT

A guide chute for dropping articles has four shock absorbable members arranged in a vertical direction at regular intervals, and four ropes for connecting the shock absorbable members to one another. Each of the shock absorbable members is composed of a frame member, a plurality of elastic trapezoidal plates which are secured to the frame member, and coil springs for retaining the trapezoidal plates in a throttled condition. The width of each of the trapezoidal plates is increased towards its free tip end. The free tip end of each of each of the trapezoidal plates extends downward and toward the axial center of the frame member and is overlapped with adjacent free tip ends of adjacent trapezoidal plates to form a conic cylindrical body by virtue of the coil springs. And the free tip ends of the trapezoidal plates define an opening of a diameter smaller than that of articles to be dropped. When the dropping articles drop, they enlarge the opening of each of the shock absorbing members. At this time, the dropping articles receive friction force from the trapezoidal plates and elastic reaction force of the coil springs and accordingly dropping energy of the dropping articles is reduced.

1 Claim, 6 Drawing Sheets

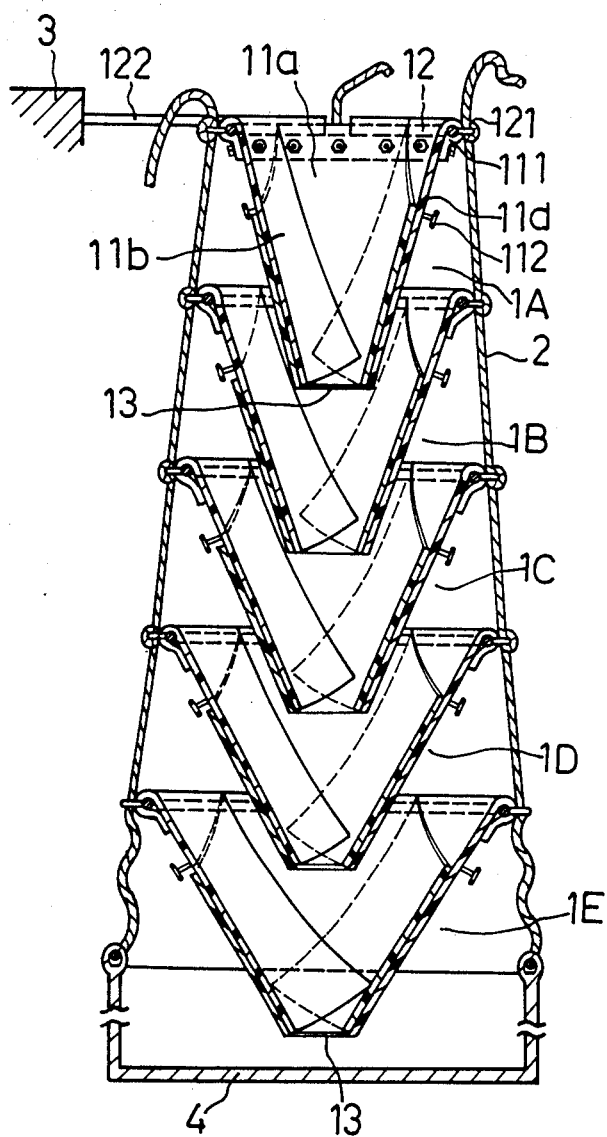
F I G. 1

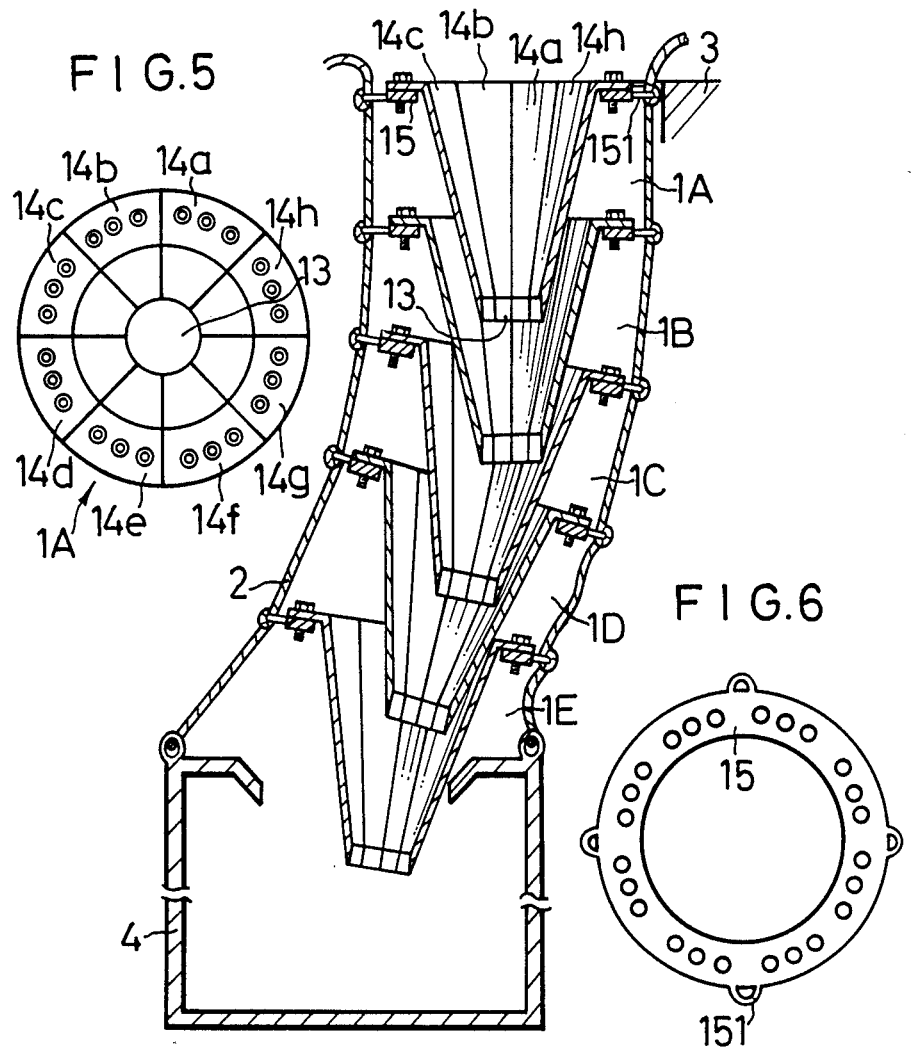

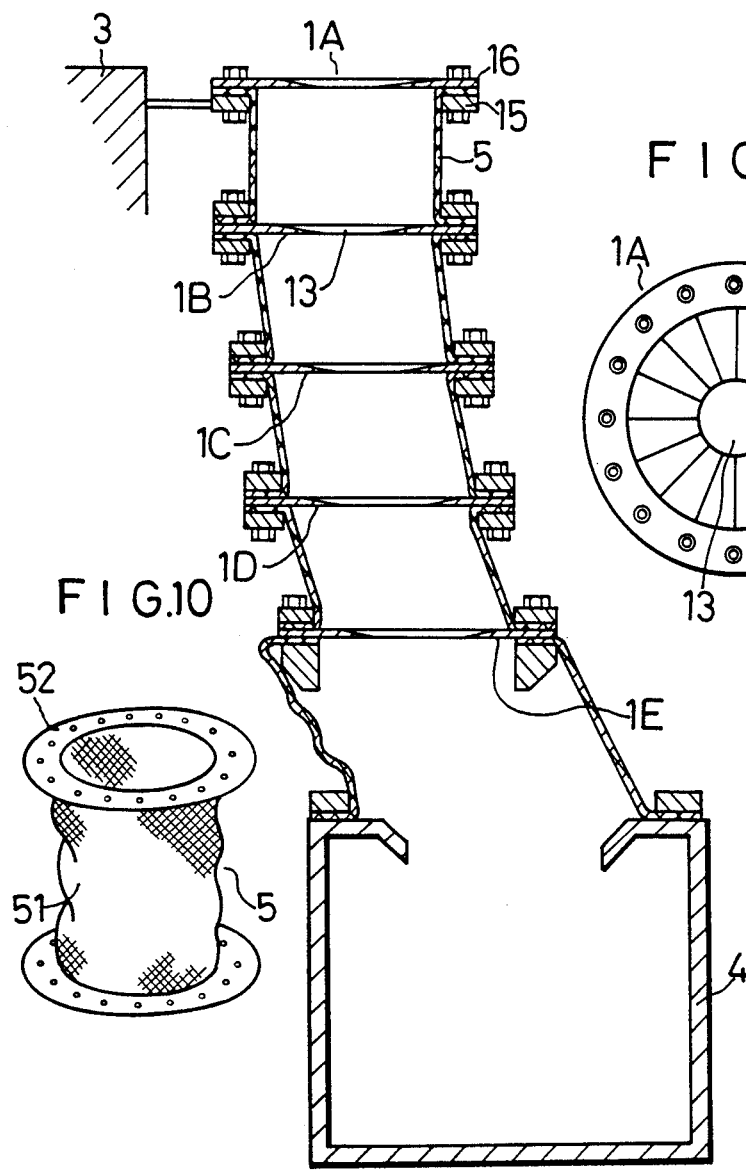
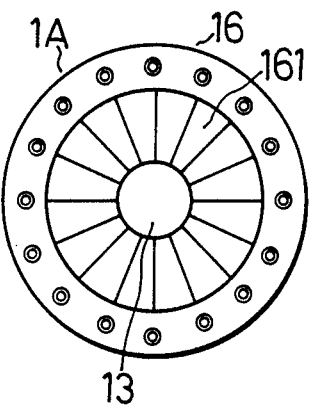
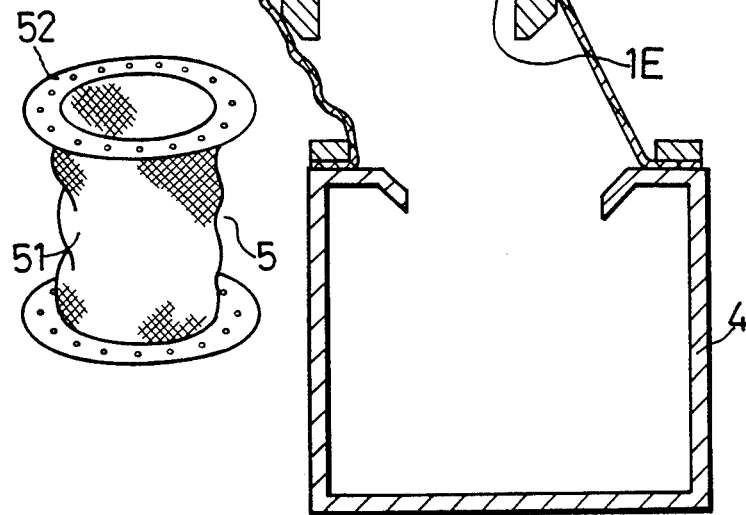
FIG.8
FIG.9
FIG.10

GUIDE CHUTE FOR DROPPING ARTICLES

BACKGROUND OF THE INVENTION

1. Field of the Invention

The present invention relates to a guide chute for guiding dropping articles, and more particularly to a guide chute capable of absorbing or reducing the dropping shock of dropping articles.

2. Description of the Prior Art

The present inventor proposed a vehicle for aerial working by which fruits are picked off tall trees in an orchard field or the like (U.S. application Ser. No. 867,442). In the proposed vehicle for aerial working, picked fruits are dropped and guided from a highly retained aerial platform into a pallet on a vehicle frame by way of a flexible chute.

Some kinds of fruits have thin rinds as compared with the weight thereof. Such fruits are frequently damaged due to the dropping shock when conventional chutes made of cloth or net are used.

SUMMARY OF THE INVENTION

It is an object of the present invention to provide a simple-structured guide chute for dropping articles, which is capable of favorably guiding dropping articles and excellently absorbing or reducing dropping shock thereof.

The guide chute for dropping articles according to the present invention has a plurality of shock absorbable members arranged vertically at proper intervals and connected to one another by means of deformable connecting members. Each of the shock absorbable members is composed of a circumferential frame member secured to the connecting members, and an elastic plate which is secured to the frame member and has a plurality of elastic plate pieces. The elastic plate pieces extend from a plurality of circumferentially arranged portions of the frame member towards an axial center of the frame member. Tip ends of the elastic plate pieces define an opening of a diameter smaller than that of dropping articles.

According to the guide chute having the above described construction, the dropping articles drop within the guide chute while being guided by the elastic plates and enlarge the opening of each of the elastic plates, overcoming the elastic force thereof. At this time, the dropping articles receive friction resistance and elastic reaction force, accordingly, the dropping energy thereof is reduced. Consequently, the dropping shock of articles dropping from elevations can be sufficiently absorbed or reduced. Furthermore, the construction of the guide chute according to the present invention is comparatively simple.

BRIEF EXPLANATION OF THE DRAWINGS

FIGS. 1 to 3 illustrate a first embodiment of a guide chute according to the present invention;

FIG. 1 is a longitudinal sectional view of the guide chute taken along the line of I—I of FIG. 2;

FIG. 2 is a top plan view of the guide chute;

FIG. 3 is a front view of a trapezoidal plate;

FIGS. 4 to 7 illustrate a second embodiment of the guide chute according to the present invention;

FIG. 4 is a longitudinal sectional view of the guide chute;

FIG. 5 is a top plan view of a shock absorbable member;

FIG. 6 is a plan view of a frame plate;

FIG. 7 is a longitudinal sectional view of the guide chute which is in a folded condition;

FIGS. 8 to 10 illustrate a third embodiment of the guide chute according to the present invention;

FIG. 8 is a longitudinal sectional view of the guide chute;

FIG. 9 is a plan view of an elastic plate; and

FIG. 10 is a perspective view of a cylindrical body; and

DETAILED DESCRIPTION OF THE EMBODIMENTS

Figure 11:
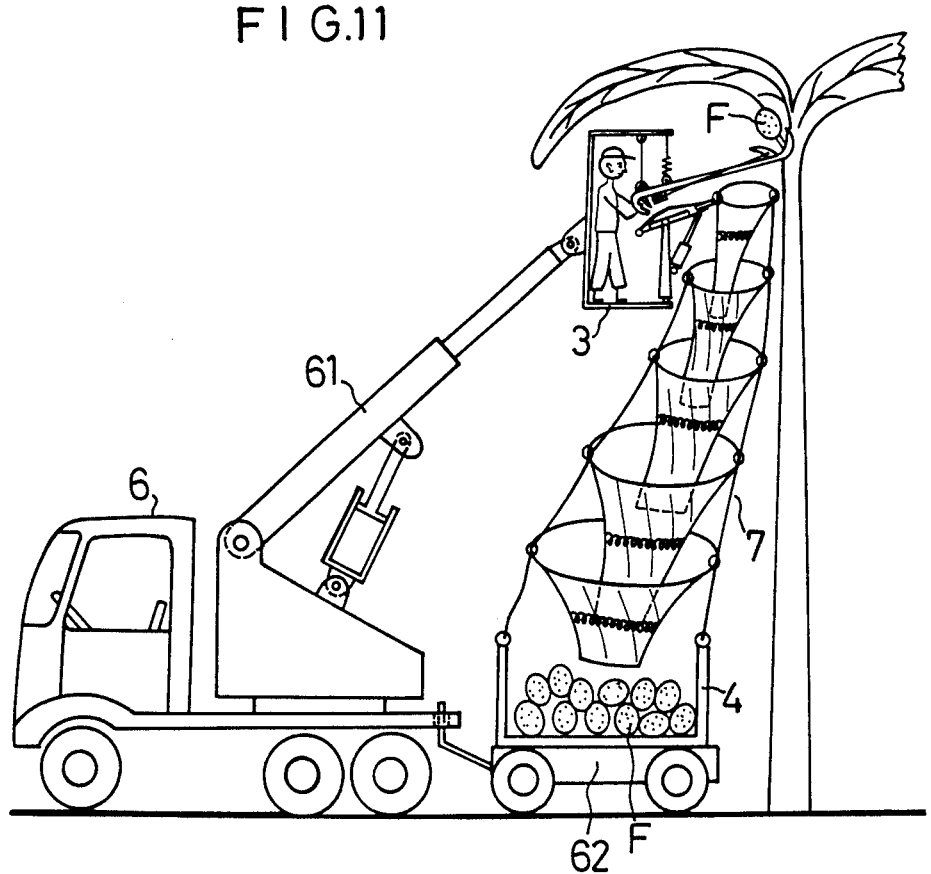
FIG. 11 is an example wherein the guide chute according to the present invention is used for picking fruits from tall trees.

FIG. 11 shows an example wherein a guide chute according to the present invention is used for picking fruits from tall trees.

In FIG. 11, a vehicle for aerial working 6 is provided with a extendable arm 61 on a rear chassis thereof. And a working platform 3 is supported by an tip end of the extendable arm 61. The vehicle 6 is connected to a cart 62. A pallet 4 is mounted on the cart 62 and a guide chute 7 is provided between the pallet 4 and the platform 3.

A fruit F picked by an operator on the platform 3 drops within the guide chute 7 and is collected within the pallet 4.

Hereinafter, the detailed construction of the guide chute will be explained.

Figure 2:
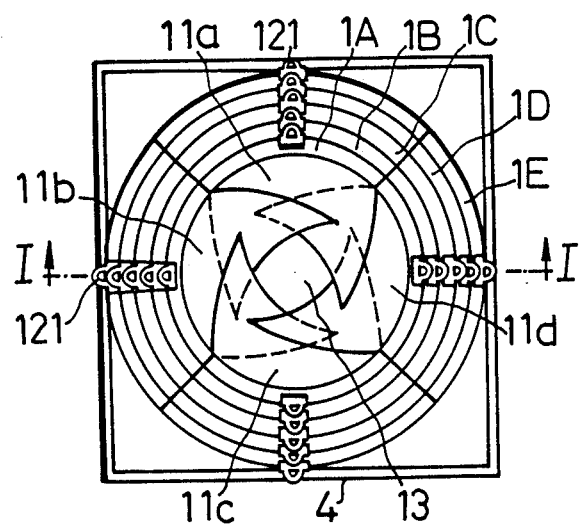

In the guide chute shown in FIGS. 1 and 2, shock absorbable members 1A, 1B, 1C, 1D, 1E are arranged in a vertical direction at regular intervals and are connected to one another by means of four ropes 2. The shock absorbable members 1A through 1E are composed of similar conical cylindrical bodies. The diameter of an upper end of each of the conical cylindrical bodies is gradually increased from the uppermost body to the lowermost body. And the lower end portion of one cylindrical body is positioned within the space defined by another cylindrical body just below the one cylindrical body.

Each of the shock absorbable members 1A through 1E is composed of a ring-shaped frame member 12 and a plurality of trapezoidal plates 11a, 11b, 11c, 11d. The upper end of each of the trapezoidal plates 11a through 11d, is secured to the ring-shaped frame member 12.

Figure 3:
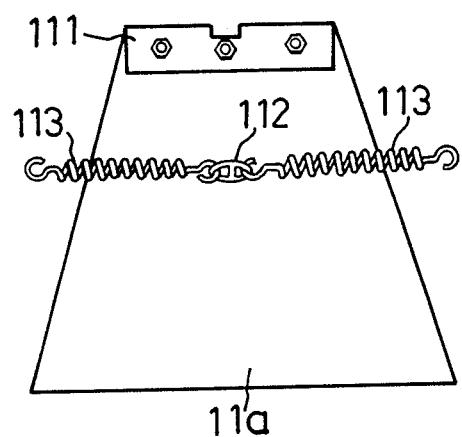

The trapezoidal plates 11a through 11d are made of flexible resin plates of the same shape with one another. As shown in FIG. 3, the upper end of each of the flexible resin plates is bent and bolted to form a bent portion 111. And then, the frame member 12 is inserted into the bent portion 111 whereby the bent portion 111 is retained by the frame member 12.

The lower end portion of each of the trapezoidal plates 11a through 11d extends downward and toward the axial center of the frame member 12 and is overlapped with the lower end portion of adjacent trapezoidal plate to define an opening 13.

From the center of the outer surface of each of the trapezoidal plates 11a through 11d is projected a ring body 112 for retaining coil springs 113. The coil springs 113 are installed between the ring bodies 112 so as to retain the trapezoidal plates 11a through 11d in a throttled condition.

Each of the ropes 2 is inserted into each of four ring bodies 121 for retaining ropes, which are provided along the frame member 12 of each of the absorbable members 1A through 1E thereby to connect the absorbable members 1A through 1E to one another.

The lower end of each of the ropes 2 is connected to the pallet 4 for picked fruits, for example, while the frame member 12 of the uppermost absorbable member 1A is secured to the platform 3 of a vehicle for aerial working, for example, through a support stay 122 projected from the frame member 12 of the absorbable member 1A. The diameter of the openings 13 is made smaller than that of fruits to be picked.

The picked fruits drop within the guide chute. While dropping, the picked fruits, enlarge the openings 13, overcoming the spring force of the coil springs 113 and the friction force of the overlapped portions of the trapezoidal plates 11a through 11d. At this time, the dropping energy of the fruits are made reduced by virtue of the friction force received from the trapezoidal plates 11a through 11d and elastic reaction force from the coil springs 113. This results in the dropping speed of the fruits dropping into the pallet 4 from the opening 13 of the shock absorbable member 1E being decreased and accordingly, damage of the dropped fruits due to the dropping shock being sufficiently reduced. The guide chute according to the present invention having the above described construction freely deforms in response to the movement of the platform 3. In this case, the shock absorbable member 1A through 1E can guide the dropping direction of the fruits and reduce the dropping energy thereof whereby the fruits are collected within the pallet 4, favorably.

As described above, the construction of the guide chute according to the present invention is simple. In addition, the guide chute according to the present invention can be folded by sequentially piling an upper shock absorbable member on a lower one.

According to the present invention, by positioning the lower end of an upper shock absorbable member within a lower shock absorbable member, the guiding route of the chute extends along a cubic curved line having an inflection point when the chute is inclined, and accordingly, at this time, the fruits can be smoothly dropped and guided into the pallet 4.

The surface-roughness of the trapezoidal plates 1a through 1d, the spring force of the coil springs 113, the diameter of the openings 13 and the like are suitably selected in accordance with the kind of things to be dropped.

FIGS. 4 through 7 illustrate a second embodiment of a guide chute according to the present invention.

In FIGS. 4 and 5, each of the shock absorbable members 1A through 1E is composed of a plurality of elastic plate pieces 14a, 14b, 14c, 14d, 14e, 14f, 14g and 14h. The elastic plate pieces 14a through 14h are arranged like a ring and are secured to a ring-shaped frame plate 15 (FIG. 6).

Each of the elastic plate pieces 14a through 14h has a trapezoidal shape of which the width is gradually decreased toward its lower end and extends downward and toward the axial center of the frame plate 15 to form a conical cylindrical body having an opening 13 in its lower end.

The upper end of each of the elastic plate pieces 14a through 14h is bent, and the formed flange portion is secured to the frame plate 15 by bolts.

Rope bodies 2 are fixed to ring bodies 151 provided in the outer surface of the frame plate 15 and connected thereto. The elastic plate pieces 14a through 14h can be composed of rubber plates, resin plates, spring steel plates or the like.

The picked fruits are dropped while being guided by the elastic plate pieces 14a through 14h of the shock absorbable members 1A through 1E, and enlarge the openings 13 while dropping. At this time, the dropping fruits receive friction force and elastic reaction force from the elastic plate pieces 14a through 14h and then, the dropping energy thereof is made reduced.

Figure 7:
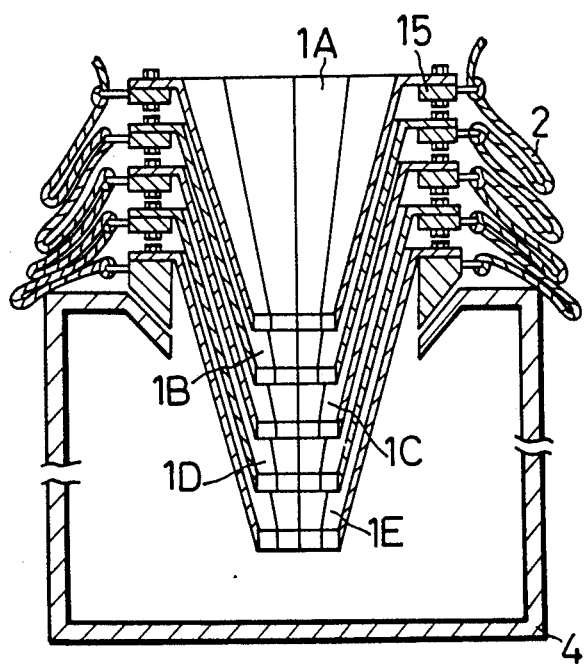

FIG. 7 illustrates the condition that the chute according to the present invention is folded.

FIGS. 8 through 10 illustrate a third embodiment of a guide chute according to the present invention. In FIGS. 8 and 9, each of the shock absorbable members 1A through 1E is composed of a circular plate-shaped elastic plate 16.

The elastic plate 16 is composed of a flange portion in its outer periphery and a certain number of fan-shaped elastic plate pieces 161 formed by cutting an inner peripheral portion at proper intervals in its circumferential direction. The tip end portion of each of the fan-shaped elastic plate pieces 161 defines an opening 13.

Each of the elastic plates 16 is connected to an adjacent one by means of a cylindrical body 5 (FIG. 10). The cylindrical body 5 has a circumferential wall 51 composed of a deformable sheet material such as tent cloth coated with resin. An upper open end and a lower open end are bent outwards to form flanges 52 for connection.

The flange 52 of the cylindrical body 5, the elastic plate 16 and a ring-shaped frame plate 15 are bolted together. This results in the shock absorbable members 1A through 1E being connected in sequence.

The dropping fruits are guided by the elastic plates 16, and drop while enlarging the openings 13 overcoming the spring force and friction resistance of the plastic plates 16. At this time, the dropping energy of the dropping fruits is made reduced.

The thickness of each elastic plate piece 161 is made decreased inwardly so that the dropping things are always pushed towards a center of each elastic plate 16 when dropping away from the center thereof.

What is claimed is:

1. A guide chute for dropping articles comprising:
a plurality of shock absorbable members arranged vertically at intervals; and
deformably connecting members for connecting said plurality of shock absorbable members vertically;
each of said plurality of shock absorbable members being composed of a circumferential frame member secured to said connecting members, and a plurality of elastic trapezoidal plate pieces each having a width gradually increasing toward its free tip end, which are secured to said frame member; said plurality of elastic trapezoidal plate pieces extending downward from a plurality of circumferentially arranged portions of said frame member towards an axial center of said frame member; said plurality of elastic trapezoidal plate pieces being assembled and retained by spring members so that said free tip ends of said plurality of elastic trapezoidal plate pieces are overlapped with each other to form a conic cylindrical body of which the diameter is decreased downward and the lower end defines an opening of a diameter smaller than that of dropping articles whereby the dropping energy of the dropping articles is reduced by friction resistance and elastic reaction force received when said opening of said conic cylindrical body is enlarged due to the drop of the dropping articles.

* * * * *